(12) United States Patent
Tanaka et al.

(10) Patent No.: US 11,990,824 B2
(45) Date of Patent: May 21, 2024

(54) DEVICE INCLUDING ROTATING ELECTRIC MACHINE AND HOUSING WITH INTRODUCTION PORT

(71) Applicant: JATCO Ltd, Fuji (JP)

(72) Inventors: Daiki Tanaka, Isehara (JP); Akira Suwabayashi, Isehara (JP); Masahiro Kosaka, Ebina (JP)

(73) Assignee: JATCO LTD, Fuji (JP)

( * ) Notice: Subject to any disclaimer, the term of this patent is extended or adjusted under 35 U.S.C. 154(b) by 180 days.

(21) Appl. No.: 17/171,123

(22) Filed: Feb. 9, 2021

(65) Prior Publication Data

US 2021/0249934 A1 Aug. 12, 2021

(30) Foreign Application Priority Data

Feb. 12, 2020 (JP) ................................ 2020-021618

(51) Int. Cl.
*H02K 9/193* (2006.01)
*H02K 5/20* (2006.01)

(52) U.S. Cl.
CPC ............ *H02K 9/193* (2013.01); *H02K 5/203* (2021.01)

(58) Field of Classification Search
CPC .......... H02K 9/193; H02K 5/20; H02K 5/203; H02K 9/197; H02K 3/24; H02K 9/19; H02K 1/148; H02K 21/16; H02K 2213/03; H02K 7/108; H02K 7/116; H02K 7/006
See application file for complete search history.

(56) References Cited

U.S. PATENT DOCUMENTS

| 2013/0278091 A1* | 10/2013 | Ohashi .................... H02K 9/00 310/58 |
| 2014/0062230 A1 | 3/2014 | Mori et al. |
| 2019/0115805 A1* | 4/2019 | Do ......................... B60L 50/16 |

FOREIGN PATENT DOCUMENTS

| CN | 209860741 U | * 12/2019 |
| JP | 2003-324901 A | 11/2003 |
| JP | 2013-005531 A | 1/2013 |
| JP | 2015-211543 A | 11/2015 |
| JP | 2015211543 A | * 11/2015 |
| JP | 2018-117479 A | 7/2018 |
| JP | 2018117479 A | * 7/2018 |
| WO | WO-2012/137862 A1 | 10/2012 |

OTHER PUBLICATIONS

Fang (CN 209860741 U) English Translation (Year: 2019).*
Imagawa (JP 2018117479 A) English Translation (Year: 2018).*
Naito (JP 2015211543 A) English Translation (Year: 2015).*

* cited by examiner

*Primary Examiner* — Tulsidas C Patel
*Assistant Examiner* — Robert E Mates
(74) *Attorney, Agent, or Firm* — Foley & Lardner LLP

(57) ABSTRACT

The power transmission device has the rotating electric machine, the housing that houses the stator of the rotating electric machine, and the pipe as a refrigerant liquid feeding member that has the holes. In the upper part of the housing is provided the opening that introduces oil ejected from the holes. In the lower part of the housing is provided the oil reservoir that forms an oil pool.

6 Claims, 5 Drawing Sheets

DEVICE INCLUDING ROTATING ELECTRIC MACHINE AND HOUSING WITH INTRODUCTION PORT

TECHNICAL FIELD

The present invention relates to a device.

BACKGROUND ART

JP2015-211543A discloses a cooling structure of a rotating electric machine in which a refrigerant flow passage pipe is provided across substantially an entire circumference of an outer edge of the rotating electric machine in an axial direction, and refrigerant is sprayed on substantially an entire surface of the outer edge of the rotating electric machine in the axial direction.

SUMMARY OF INVENTION

In a case in which oil is fed across the entire circumference of the rotating electric machine, the number of nozzles (refrigerant liquid feeding port) becomes large. If the number of nozzles is large, spraying force of each one of the nozzles tends to decrease.

The present invention is accomplished in view of such problem, and an object thereof is to reduce the number of refrigerant liquid feeding ports in cooling a rotating electric machine.

A device of an aspect of the present invention includes a rotating electric machine, a housing configured to house a stator of the rotating electric machine, and a refrigerant liquid feeding member provided outside the housing and which has a refrigerant liquid feeding port. The housing is provided with an introduction port in an upper part thereof, configured to introduce refrigerant liquid ejected from the refrigerant liquid feeding port, and the housing is provided with a refrigerant liquid reservoir at a lower part thereof, configured to form a refrigerant liquid pool.

According to the above aspect, at least the lower part side of the housing can be cooled by the refrigerant liquid flowing down from the upper part of the housing. Therefore, it is possible to omit a refrigerant liquid feeding port on the lower part side of the housing, thus it is possible to reduce the number of the refrigerant liquid feeding ports. Therefore, according to the above aspect, it is possible to reduce the number of the refrigerant liquid feeding ports in providing at least one or more of the refrigerant liquid feeding ports. As a result, it is possible to reduce the number of the refrigerant liquid feeding ports as much as possible, for example to the least necessary.

DESCRIPTION OF EMBODIMENTS

An embodiment of the present invention will be described below with reference to accompanied drawings.

Below describes a hybrid vehicle (Hereinafter, simply called "vehicle") 100 including a power transmission device 10 as a device according to the embodiment of the present invention, with reference to the accompanied drawings.

Figure 1:
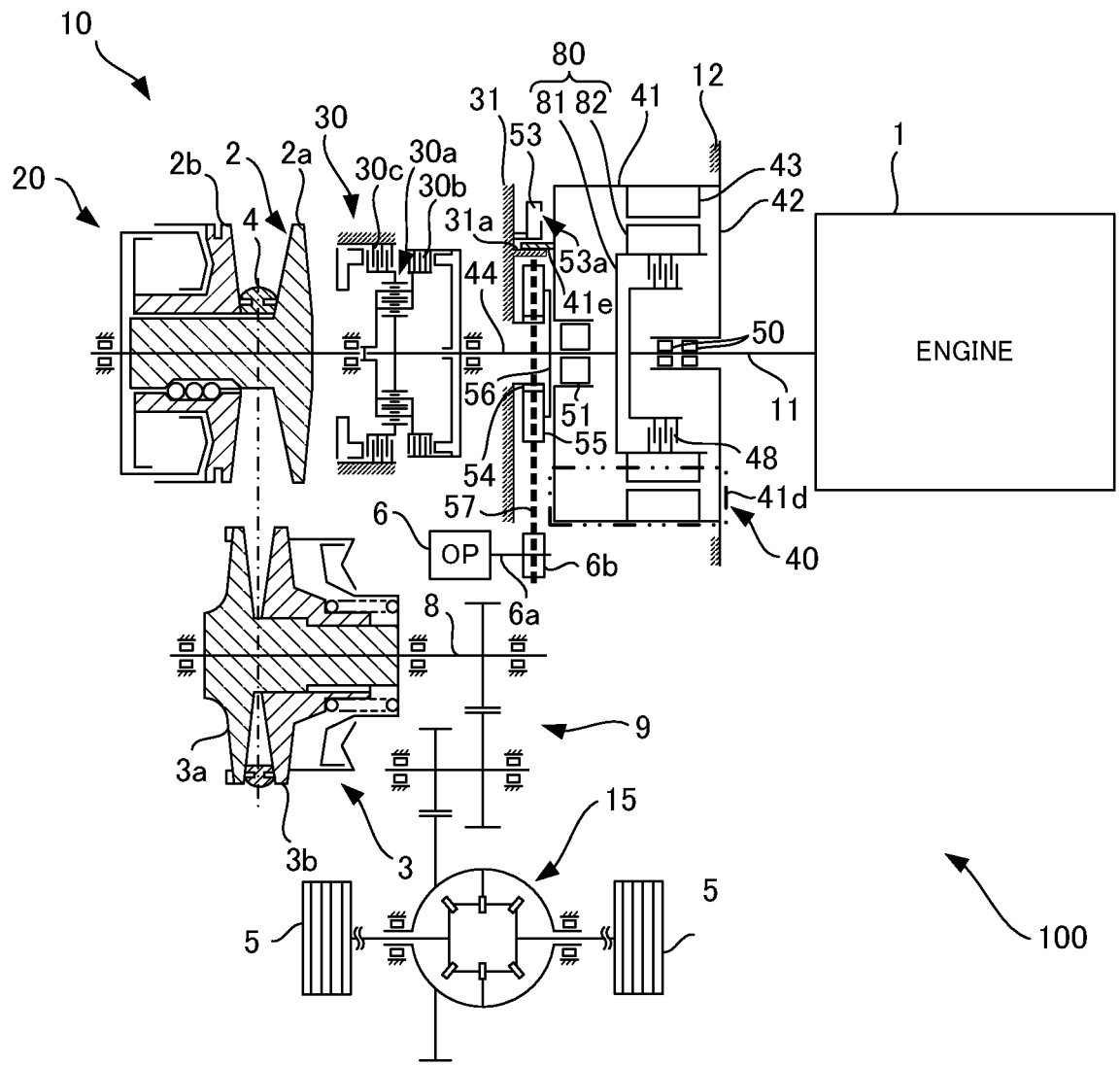
FIG. 1 is a schematic diagram of a hybrid vehicle including a device according to an embodiment of the present invention.

FIG. 1 is a schematic diagram of the vehicle 100. As illustrated in FIG. 1, the vehicle 100 includes an engine 1, and the power transmission device 10 provided in a power transmission path that connects the engine 1 and drive wheels 5.

In the present embodiment, the power transmission device 10 is a transmission, and includes a variator 20, a forward/reverse switching mechanism 30, and a rotating electric machine 40.

The rotating electric machine 40 is provided between the variator 20 and the engine 1 in the power transmission path.

The rotating electric machine 40 includes a housing 41, a cover 42 as a fixed member provided on an opening on the engine 1 side of the housing 41, a stator 43 provided on an inner circumference of the housing 41, a rotating shaft 44, a rotor 80 provided on an outer circumference of the rotating shaft 44, and a clutch 48 that connects and disconnects the rotor 80 and an input shaft 11. The rotor 80 includes a rotor frame 81, and a core 82 provided on an outer circumference of the rotor frame 81.

The rotating electric machine 40 is fixed to the power transmission device 10 by having the cover 42 fastened to a case 12 of the power transmission device 10 with a bolt (not illustrated).

The input shaft 11 is rotatably supported to the cover 42 via a bearing 50, and receives output rotation of the engine 1. Moreover, the rotating shaft 44 is rotatably supported to the housing 41 via a bearing 51.

The clutch 48 is a normally open hydraulic clutch. The clutch 48 is controlled in engaging and disengaging by hydraulic pressure regulated by a hydraulic control valve unit (not illustrated). The clutch 48 is a wet multiple-plate clutch, however other clutches may be used.

When the clutch 48 is engaged, the input shaft 11 and the rotor 80 are directly linked. Namely, the input shaft 11 and the rotating shaft 44 are directly linked and rotates at the same velocity.

The rotating electric machine 40 may operate as an electric motor that drives by rotation in response to receiving electric power from a battery (not illustrated). Moreover, the rotating electric machine 40 functions as a generator in a case in which the rotor 80 receives rotating energy from the drive wheels 5, and can charge the battery.

The variator 20 has a primary pulley 2 and a secondary pulley 3 disposed so that their V-grooves are aligned, and a belt 4 provided across the V-grooves of the pulleys 2, 3.

The engine 1 is arranged coaxially to the primary pulley 2, and the rotating electric machine 40 and the forward/reverse switching mechanism 30 are provided between the engine 1 and the primary pulley 2, in the order from the engine 1, the rotating electric machine 40, the forward/reverse switching mechanism 30, and the primary pulley 2.

The forward/reverse switching mechanism 30 has a double pinion planetary gear set 30a as its main component, whose sun gear is coupled to the rotating shaft 44 of the rotating electric machine 40, and whose carrier is coupled to the primary pulley 2 of the variator 20. The forward/reverse switching mechanism 30 further includes a forward clutch 30b that directly links the sun gear and the carrier of the double pinion planetary gear set 30a, and a reverse brake 30c that fixes a ring gear. At a time of engaging the forward clutch 30b, inputted rotation from the rotating shaft 44 is transmitted to the primary pulley 2 in a rotating direction as it is, and at a time of engaging the reverse brake 30c, the inputted rotation from the rotating shaft 44 is reversed and is transmitted to the primary pulley 2.

The forward clutch 30b engages by clutch pressure being supplied from the hydraulic control valve unit in a case in which a forward running mode is selected as a running mode of the vehicle 100. The reverse brake 30c engages by brake pressure being supplied from the hydraulic control valve unit in a case in which a reverse running mode is selected as the running mode of the vehicle 100.

Rotation of the primary pulley 2 is transmitted to the secondary pulley 3 via the belt 4, and the rotation of the secondary pulley 3 is transmitted to the drive wheels 5 through the output shaft 8, a gear set 9 and a differential gear device 15.

To enable variation in speed ratio between the primary pulley 2 and the secondary pulley 3 during the above power transmission, one of conical plates that form the V-grooves of the primary pulley 2 and the secondary pulley 3 is fixed conical plates 2a, 3a, and the other is to be movable conical plates 2b, 3b that can be displaced in the axial direction.

These movable conical plates 2b, 3b are biased towards the fixed conical plates 2a, 3a by primary pulley pressure and secondary pulley pressure being supplied from the hydraulic control valve unit, and by this, the belt 4 is frictionally engaged to the conical plates to transmit power between the primary pulley 2 and the secondary pulley 3.

In the shift, a target speed ratio is achieved by varying a width of the V-grooves of the primary pulley 2 and the secondary pulley 3 by a pressure difference between the primary pulley pressure and the secondary pulley pressure caused in accordance with the target speed ratio, and continuously changing a diameter of a winding arc of the belt 4 with respect to the pulleys 2, 3.

Between the rotating electric machine 40 and the forward/reverse switching mechanism 30 are provided a pipe 53 as a refrigerant liquid feeding member that extends in an arc form along the circumferential direction of the rotating electric machine 40, and an intermediate cover 31 that covers the forward/reverse switching mechanism 30 on the rotating electric machine 40 side and that faces the rotating electric machine 40 in the axial direction via the pipe 53. The intermediate cover 31 is equivalent to an opposing member, and opposes the housing 41 of the rotating electric machine 40.

The pipe 53 is connected to an oil passage provided inside the intermediate cover 31, and is configured to eject oil supplied via the intermediate cover 31 towards the stator 43 of the rotating electric machine 40 from a plurality of holes 53a formed on the rotating electric machine 40 side.

An oil reservoir 41d forming an oil pool is provided at the lower part of the housing 41, and the lower part side of the housing 41 is cooled by the oil flowing down from an upper part of the housing 41. The oil reservoir 41d is for example formed below the clutch 48, and in the oil reservoir 41d, oil is pooled up to a position higher than a lower edge of the core 82 for example. The oil is equivalent to the refrigerant liquid, and the oil reservoir 41d is equivalent to a refrigerant liquid reservoir.

The intermediate cover 31 has a sprocket 55 rotatably supported via a bushing 54. The sprocket 55 is connected to the rotating shaft 44 of the rotating electric machine 40 via a connecting member 56, and the sprocket 55 is further coupled to a sprocket 6b provided on an input shaft 6a of an oil pump 6 with a chain 57. This causes the oil pump 6 to be driven when the rotating electric machine 40 rotates, thus feeding oil to the hydraulic control valve unit.

Figure 4:
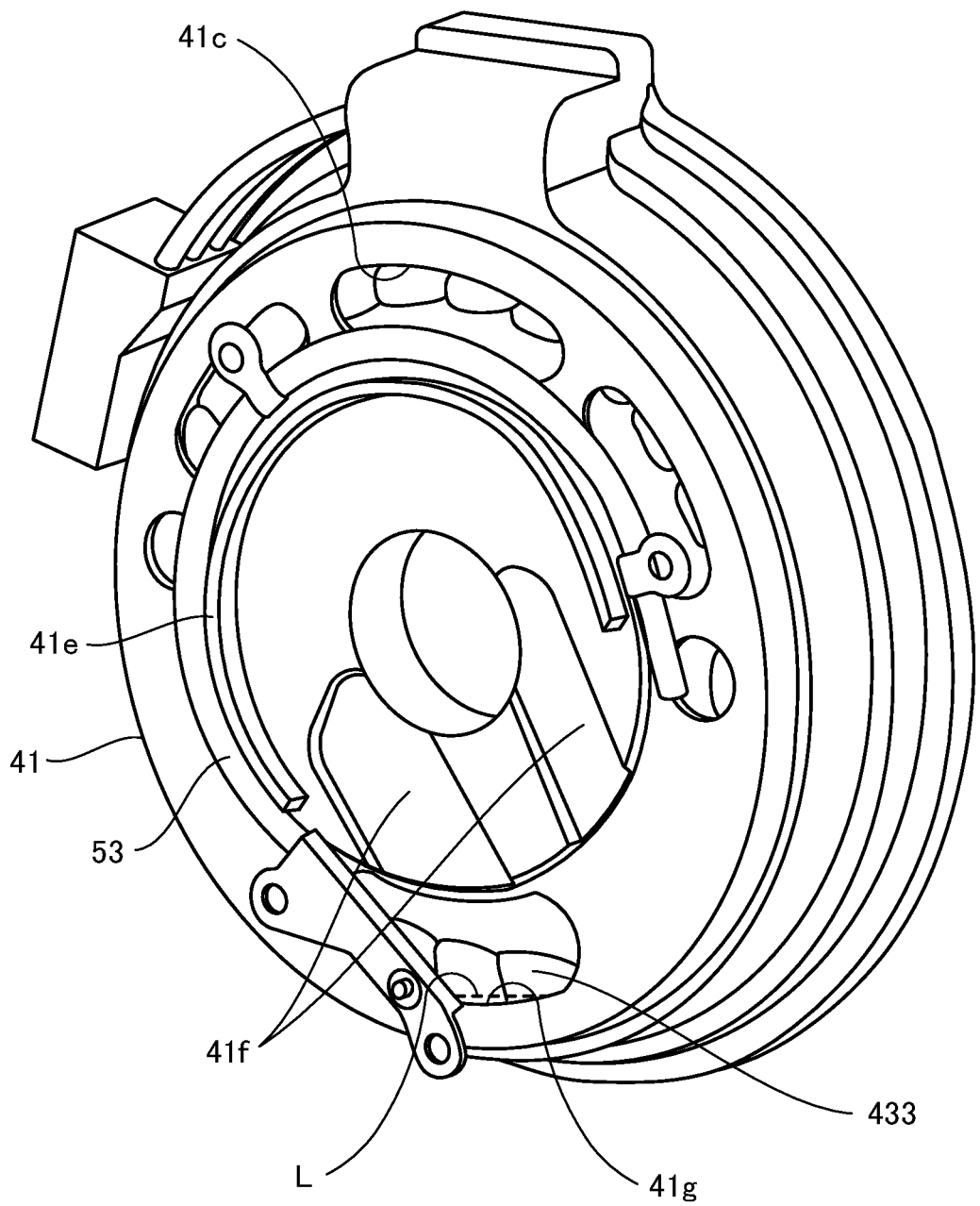
FIG. 4 is a view illustrating a housing together with a pipe.
Figure 5:
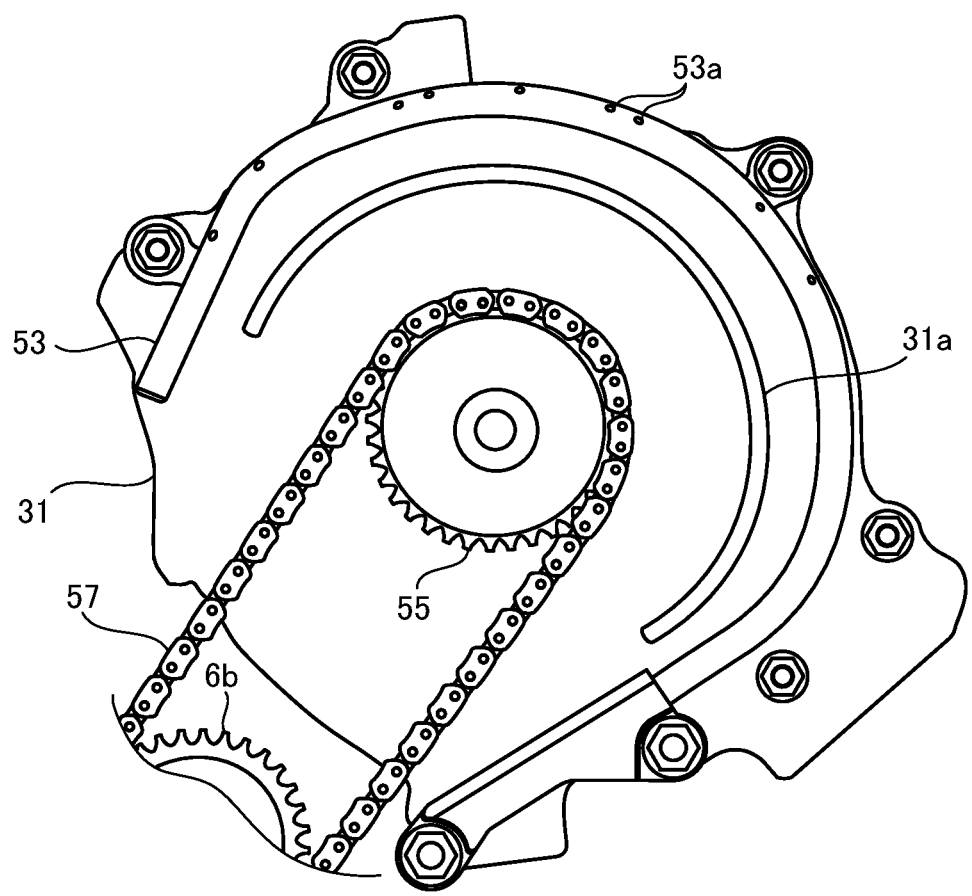
FIG. 5 is a view illustrating an intermediate cover together with a pipe and a chain.

The bushing 54 and the sprocket 55 are provided at locations that overlap the pipe 53 in a radial direction. To "overlap in a radial direction" means to be disposed so that at least one part thereof overlaps when viewed from the radial direction. Moreover, as illustrated in FIGS. 4 and 5 described later, the chain 57 is disposed between one end and the other end of the arc-shaped pipe 53, namely, to be passed through a cut-out of the pipe 53. Thus, it is possible to hold down the size of the power transmission device 10 in the axial direction.

A protrusion 41e and a protrusion 31a are provided between the sprocket 55 and the pipe 53. The protrusion 41e is provided on the housing 41, and protrudes in the axial direction from the housing 41. The protrusion 31a is provided on the intermediate cover 31, and protrudes in the axial direction from the intermediate cover 31. The protrusion 41e and the protrusion 31a overlap in the radial direction. The protrusion 41e and the protrusion 31a abut each other in the radial direction. Peripheral parts of the housing 41 and the intermediate cover 31 are further described later.

The vehicle 100 is configured as above, and has, as driving modes, an EV mode that runs by driving force from just the rotating electric machine 40 by driving the rotating electric machine 40 with electric power supplied from the battery, an engine running mode that runs by driving force by just the engine 1, and an HEV mode that runs by the driving force of the engine 1 and the driving force of the rotating electric machine 40.

In the EV mode, the vehicle 100 runs by driving just the rotating electric machine 40 by the electric power from the battery, in a state disengaging the clutch 48 and engaging one of either the forward clutch 30b or the reverse brake 30c.

In the engine running mode, the vehicle 100 runs by driving just the engine 1 in a state engaging the clutch 48 and one of either the forward clutch 30b or the reverse brake 30c.

In the HEV mode, the vehicle 100 runs by driving the engine 1 and the rotating electric machine 40 in a state engaging the clutch 48 and one of either the forward clutch 30b or the reverse brake 30c.

Figure 2:
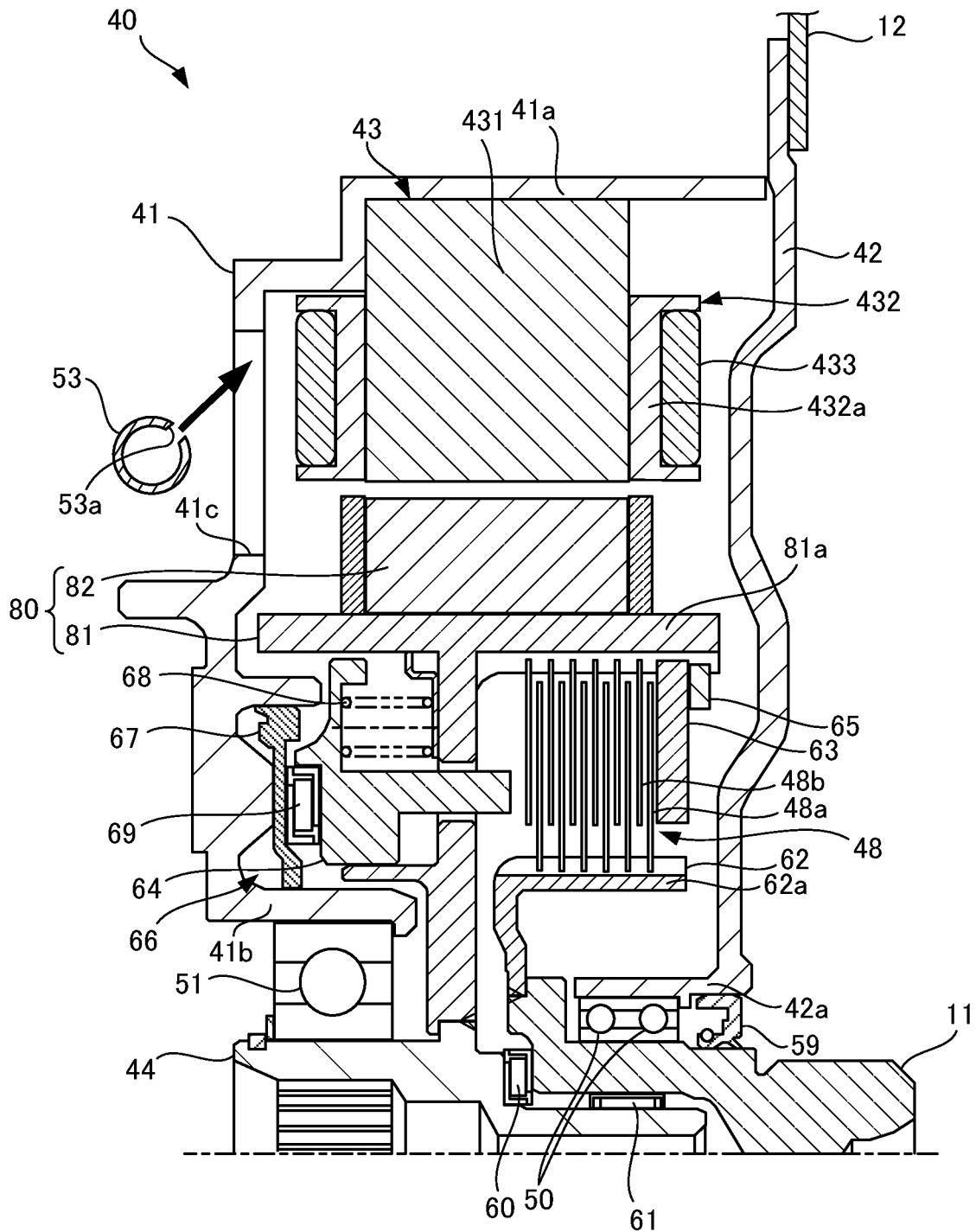
FIG. 2 is a cross-sectional view of a rotating electric machine.

Next describes a configuration of the rotating electric machine 40 in details, with reference to FIG. 2. FIG. 2 is a cross-sectional view of the rotating electric machine 40.

As illustrated in FIG. 2, the housing 41 has a cylindrical portion 41a provided on an outer circumference side, and a cylindrical portion 41b provided on an inner circumference side and extending internally into the housing 41. The inner circumference of the cylindrical portion 41a has the stator 43 fixed thereon. The cylindrical portion 41b rotatably supports the rotating shaft 44 via the bearing 51.

The stator 43 is configured by having a stator core 431, an insulator 432, and a stator coil 433. The stator core 431 is configured by stacking a plurality of thin electromagnetic steel plates. The insulator 432 is for example made of resin, and is provided on the stator core 431 to insulate the stator core 431 and the stator coil 433. The stator coil 433 is wound on a coil winding portion 432a of the insulator 432.

Figure 3:
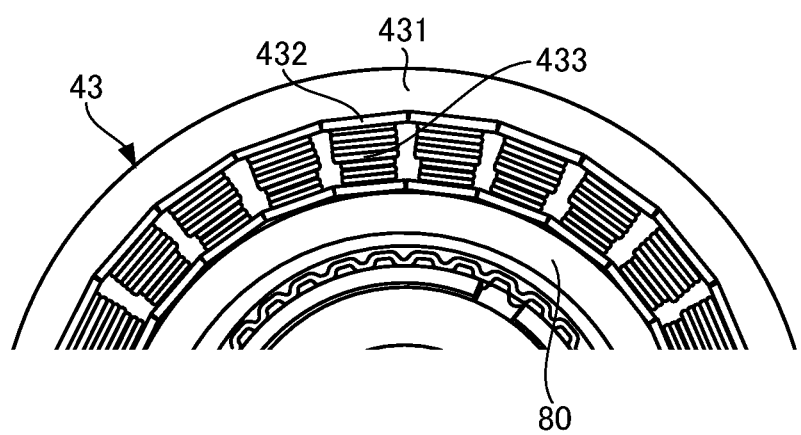
FIG. 3 is a view illustrating an essential part of a stator.

FIG. 3 is a view illustrating an essential part of the stator 43. FIG. 3 illustrates the essential part of the stator 43 viewed along the axial direction from the pipe 53 side. The insulator 432 is provided in a plural number along a circumferential direction of the rotating electric machine 40. The stator core 431 has a plurality of projections extending internally in the radial direction from a ring-shaped part, and the insulators 432 are mounted on the projections. The stator coil 433 is wound on the insulators 432 in the state mounted on the stator core 431.

Returning back to FIG. 2, an opening 41c is formed on a plane of the housing 41 that opposes the pipe 53. Accordingly, as shown by the arrow, oil ejected from the hole 53a of the pipe 53 is sprayed directly to the stator coil 433 through the opening 41c.

As a result, the stator coil 433 that generates heat is efficiently cooled. Therefore, it is possible to cool the stator 43 efficiently, thus it is possible to cool the rotating electric machine 40 efficiently. The hole 53a is equivalent to the refrigerant liquid feeding port.

The cover 42 is fixed to the case 12 of the power transmission device 10 at an outer circumference side. Moreover, the cover 42 has a cylindrical portion 42a provided in the inner circumference side and extending towards the housing 41 side. The cylindrical portion 42a rotatably supports the input shaft 11 via the bearing 50.

Between the cylindrical portion 42a and the input shaft 11 is provided a sealing member 59 for preventing leakage of oil to the outside.

Between the input shaft 11 and the rotating shaft 44 are provided a needle bearing 60 that receives load in the axial direction and a needle bearing 61 that receives load in the radial direction.

A clutch hub 62 is fixed on an end portion of the input shaft 11 on the forward/reverse switching mechanism 30 side, by welding. The clutch hub 62 has a cylindrical portion 62a provided on the outer circumference side and which extends towards the engine 1. A plurality of drive plates 48a of the clutch 48 is splined to the outer circumference of the cylindrical portion 62a, in a manner slidable in the axial direction.

A rotor frame 81 is fixed on the outer circumference of the rotating shaft 44, by welding. The rotor frame 81 has a cylindrical portion 81a provided on the outer circumference side. A core 82 is fixed on the outer circumference of the cylindrical portion 81a.

Driven plates 48b of the clutch 48 are splined to an inner circumference of the cylindrical portion 81a, in a manner slidable in the axial direction. A retainer plate 63 is placed between the driven plates 48b disposed at an end portion opposite of a piston arm 64, and a ring 65 fixed to a groove on the inner circumference of the cylindrical portion 81a. The retainer plate 63 has a thickness in the axial direction thicker than the driven plates 48b, and prevents the drive plates 48a and the driven plates 48b from leaning.

When engaging pressure is supplied from the hydraulic control valve unit to a piston oil chamber 66, a piston 67 moves towards the engine 1 side upon compressing a return spring 68. The clutch 48 becomes in an engaged state by pressing force transmitted from the piston 67 via a needle bearing 69 and the piston arm 64. The needle bearing 69 prevents the piston 67 from corotating together with the rotation of the piston arm 64.

Next describes the peripheral portions of the housing 41 and the intermediate cover 31 that opposes the housing 41, with reference to FIGS. 4 and 5.

FIG. 4 is a view illustrating the housing 41 together with the pipe 53. FIG. 5 is a view illustrating the intermediate cover 31 together with the pipe 53 and the chain 57. FIG. 4 is a view looking at the housing 41 from the intermediate cover 31 side, and FIG. 5 is a view looking at the intermediate cover 31 from the housing 41 side.

As illustrated in FIG. 4, the opening 41c is provided at the upper part of the housing 41. The opening 41c is shaped long in the circumferential direction, and a plurality thereof (three in this embodiment) is provided along the circumferential direction. The shapes and numbers of the opening 41c is not limited to this, and may be of different shapes and numbers.

The opening 41c introduces oil ejected from the holes 53a of the pipe 53 to the inside of the housing 41. In FIG. 4, the holes 53a are at the back side of the pipe 53, and are open as illustrated in FIG. 5. The holes 53a may be configured by a nozzle. The oil introduced from the opening 41c illustrated in FIG. 4 is fed to the stator 43 housed in the housing 41. The opening 41c is equivalent to the introduction port.

The pipe 53 is provided outside the housing 41, and has a cut-out between one end and the other end thereof. The pipe 53 is an arc-shaped pipe of an arc form. The arc form is to have a curved form with an upper convex shape, and for example may be of an ellipse arc form.

A communication port 41g is provided at the lower part of the housing 41. The communication port 41g links with the case 12 that houses the housing 41, and communicates the inside of the case of the power transmission device 10 that houses the intermediate cover 31 and the pipe 53 with the oil reservoir 41d.

The communication port 41g discharges oil from the oil reservoir 41d, and a liquid surface height of the oil reservoir 41d is defined by a lower edge of the communication port 41g. The liquid surface L illustrated by the broken line is a liquid surface of the oil reservoir 41d defined in accordance with the lower edge of the communication port 41g, and illustrates the liquid surface on a front surface of the communication port 41g of the stator coil 433.

As obvious from the liquid surface L, the lower edge of the communication port 41g is provided overlapping the stator coil 433 in the axial direction. This makes the liquid surface height of the oil reservoir 41d be located on the inner circumference side than a lower edge of an outermost circumference of the stator coil 433 immersed in the oil of the oil reservoir 41d. This results to securing contact between the stator coil 433 and the oil in the oil reservoir 41d, thus enhancing the cooling effect.

Furthermore, this case prevents intrusion of the oil into an air gap in a motor part of the rotating electric machine 40 (air gap formed by a gap between the stator 43 and the rotor 80). As a result, in a case in which the liquid surface height of the oil reservoir 41d is located on the outer circumference side than the lower edge of the outermost circumference of the stator coil 433 immersed in the oil of the oil reservoir 41d, the oil intrudes into the air gap from the oil reservoir 41d, thus causing a large rotational resistance against the rotor 80, the case of the present invention prevents the occurrence of such circumstance. The communication port 41g is equivalent to a discharge port.

As illustrated in FIG. 5, the chain 57 extends from the inner circumference side of the pipe 53 to the outer circumference side of the pipe 53 via the cut-out of the pipe 53. The inner circumference side of the pipe 53 is provided with a sprocket 55 that drives the chain 57. The sprocket 55 is equivalent to a chain sprocket.

As illustrated in FIG. 4, the housing 41 has depressions 41f that oppose the chain 57. The chain 57 and the sprocket 55 are disposed close to the housing 41 by the degree to which interference between the housing 41 and the chain 57 is avoided by the depression 41f.

As illustrated in FIGS. 4 and 5, the protrusion 41e and the protrusion 31a are both provided in a manner surrounding the sprocket 55. The protrusion 41e and the protrusion 31a are both formed in an arc form as with the pipe 53, and have cut-outs between one end and the other end thereof. Therefore, the chain 57 does not interfere with the protrusion 41e and the protrusion 31a.

The protrusion 41e and the protrusion 31a both function as a cover that prevents the oil from flowing down and pouring onto the sprocket 55 from the pipe 53 and the housing 41 upon ejection from the pipe 53. The protrusion 41e is equivalent to a housing protrusion, and the protrusion 31a is equivalent to an opposing member protrusion. The protrusion 41e and the protrusion 31a both configure a partition that surrounds the sprocket 55, between the pipe 53 and the sprocket 55.

Next describes main operations and effects of the present embodiment.

The power transmission device 10 has the rotating electric machine 40, the housing 41 that houses the stator 43 of the rotating electric machine 40, and the pipe 53 as a refrigerant liquid feeding member that has the holes 53a. In the upper part of the housing 41 is provided the opening 41c that introduces oil ejected from the holes 53a. In the lower part of the housing 41 is provided the oil reservoir 41d that forms an oil pool.

According to such a configuration, it is at least possible to perform cooling by the oil flowing down from the upper part of the housing 41 at the lower part side of the housing 41. It is hence possible to omit the holes 53a on the lower part side of the housing 41, thus it is possible to reduce the number of the holes 53a. Therefore, according to such a configuration, it is possible to reduce the number of holes 53a in providing at least one or more of the holes 53a. As a result, it becomes possible to reduce the number of the holes 53a as much as possible, for example to the least necessary.

In the present embodiment, the pipe 53 is configured by an arc-shaped pipe. The power transmission device 10 has the chain 57 that extends from the inner circumference side of the pipe 53 to the outer circumference side of the pipe 53 via the cut-out of the pipe 53, and the sprocket 55 provided on the inner circumference side of the pipe 53 and which drives the chain 57.

In the present embodiment, the lower part of the housing 41 is provided with the communication port 41g that discharges oil. The lower edge of the communication port 41g overlaps the stator coil 433 in the axial direction.

According to such a configuration, the liquid surface height of the oil reservoir 41d is located on the inner circumference side than the lower edge in the outermost circumference of the stator coil 433 immersed in the oil of the oil reservoir 41d. Therefore, it becomes possible to achieve both the securing of cooling property of the stator coil 433 and the prevention of oil intrusion into the air gap in the motor part of the rotating electric machine 40.

According to such a configuration, the pipe 53 does not need to be provided for the entire circumference. Therefore, it is possible to enlarge the cut-out, thus it is possible to extend the chain 57 from the inner circumference side of the pipe 53 to the outer circumference side via the cut-out. Therefore, it is possible to provide the sprocket 55 so as to overlap the pipe 53 in the radial direction, which accordingly can reduce the size in the axial direction.

The power transmission device 10 has the protrusion 41e and the protrusion 31a as partitions that surround the sprocket 55, between the pipe 53 and the sprocket 55.

According to such a configuration, it is possible to prevent an increase in agitation resistance of oil in the sprocket 55 by the oil flowing down from the pipe 53 and/or the housing 41 being poured onto the sprocket 55.

In the present embodiment, the partition is configured to include the protrusion 41e that protrudes from the housing 41 in the axial direction.

According to such a configuration, the number of components may be reduced by configuring the partition by using the housing 41 existing in the power transmission device 10.

In the present embodiment, the power transmission device 10 has the intermediate cover 31 that opposes the housing 41, and the partition is configured to include the protrusion 31a that protrudes from the intermediate cover 31 in the axial direction.

According to such a configuration, the number of components may be reduced by configuring the partition by using the intermediate cover 31 existing in the power transmission device 10.

In the present embodiment, the power transmission device 10 has the intermediate cover 31 that opposes the housing 41, and the partition is configured to include the protrusion 41e and the protrusion 31a. The protrusion 41e and the protrusion 31a overlap in the radial direction.

According to such a configuration, the number of components may be reduced by configuring the partition by using the housing 41 and the intermediate cover 31 which exist in the power transmission device 10. Moreover, the two protrusions, the protrusion 41e and the protrusion 31a are used to overlap these two in the radial direction; hence it is possible to further reduce the amount of oil that may flow to the sprocket 55.

In the present embodiment, the housing 41 has the depression 41f that opposes the chain 57.

According to such a configuration, it is possible to have the chain 57 be closer to the housing 41, thus it is possible to shorten the power transmission device 10 in the axial direction.

The above describes an embodiment of the present invention, however the above embodiment merely illustrates one portion of an application example of the present invention, and does not intend to limit the technical range of the present invention to the specific configurations in the above embodiment.

For example, in the above embodiment, the device is described as the power transmission device 10. However, the device may be a rotating electric machine installed device (a device installing a rotating electric machine) or the like, and the power transmission device 10 may be recognized as the rotating electric machine installed device.

Moreover, in the above embodiment, the power transmission device 10 is described as a transmission. However, the power transmission device 10 may be a reducer, a transmission with a motor (also a rotating electric machine installed device), a reducer with a motor (also a rotating electric machine installed device), or the like.

The present application claims a priority based on Japanese Patent Application No. 2020-021618 filed with the Japan Patent Office on Feb. 12, 2020, all the contents of which are hereby incorporated by reference.

What is claimed is:

1. A device, comprising:
a rotating electric machine;
a housing configured to house a stator of the rotating electric machine; and
a refrigerant liquid feeding member provided outside the housing and having a refrigerant liquid feeding port,
wherein the housing has an introduction port formed in an upper part thereof, the introduction port configured to introduce refrigerant liquid ejected from the refrigerant liquid feeding port, and
wherein the housing has a refrigerant liquid reservoir formed in a lower part thereof, the refrigerant liquid reservoir configured to form a refrigerant liquid pool, wherein the refrigerant liquid feeding member is configured by an arc-shaped pipe, and the device has a chain extending from an inner circumference side of the arc-shaped pipe to an outer circumference side of the arc-shaped pipe via a cut-out of the arc-shaped pipe, and a chain sprocket provided on the inner circumference side of the arc-shaped pipe and configured to drive the chain.

2. The device according to claim 1, wherein the arc-shaped pipe and the chain sprocket has a partition therebetween, the partition configured to surround the chain sprocket.

3. The device according to claim 2, wherein the partition is configured to include a housing protrusion that protrudes from the housing in an axial direction.

4. The device according to claim 2, wherein the device includes an opposing member that opposes the housing, and the partition is configured to include an opposing member protrusion configured to protrude from the opposing member in an axial direction.

5. The device according to claim 2, wherein the device includes an opposing member that opposes the housing, the partition is configured to include a housing protrusion configured to protrude from the housing in an axial direction and an opposing member protrusion configured to protrude from the opposing member in an axial direction, and the housing protrusion and the opposing member protrusion overlap in a radial direction.

6. The device according to claim 1, wherein the housing has a depression that opposes the chain.

* * * * *